United States Patent Office 3,663,528
Patented May 16, 1972

---

3,663,528
AZO PYRAZOLE DYESTUFFS CONTAINING AN AMINO-, HYDRAZINO- OR ETHERIFIED HYDROXYL-AMINOALKYLENE GROUP WHICH MAY BE QUATERNIZED
Visvanathan Ramanathan, Basel, Switzerland, assignor to Ciba Limited, Basel, Switzerland
No Drawing. Filed Apr. 29, 1969, Ser. No. 820,275
Claims priority, application Switzerland, May 13, 1968, 7,078/68
Int. Cl. C09b 29/38; D06p 3/24
U.S. Cl. 260—156                    14 Claims

ABSTRACT OF THE DISCLOSURE

Basic azo dyestuff of the formula

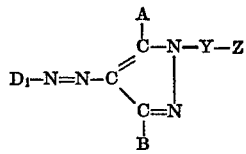

wherein Y denotes an alkylene chain of up to 6 carbon atoms which may be interrupted by a hetero-atom selected from the group consisting of nitrogen, oxygen or sulfur, A denotes amino or lower alkylamino, B denotes hydrogen, lower alkyl, lower alkoxy or phenyl, Z denotes an amino, hydrazino or etherified hydroxylamino group which may be quaternized, and $D_1$ is the residue of a diazo component; the new dyestuffs are especially valuable for dyeing synthetic fibers such as polyvinylchloride, polyamide or polyurethane with good general fastness properties, such as fastness to light, washing and sublimation.

---

The present invention provides new valuable azo dyestuffs, preferably free of sulphonic acid groups, of the general formula (1)             D—N=N—Pz wherein D denotes the residue of a diazo component which may contain further azo groups and Pz denotes the residue of a 5-aminopyrazole bound to the azo group in the 4-position and containing in the 1-position an optionally quaternised amino, hydrazino or etherified hydroxylamino group bound via an alkylene bridge. In particular the invention provides azo dyestuffs of formula (2)

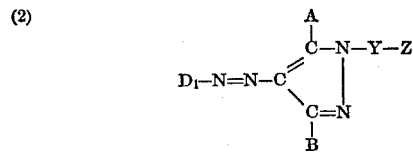

wherein Y denotes an alkylene bridge which may be interrupted by hetero-atoms, for example oxygen or nitrogen atoms, A denotes a secondary or especially a primary amino group, B denotes hydrogen or an alkyl, alkoxy or aryl group, Z denotes an optionally quaternised amino, hydrazino or etherified hydroxylamino group, and $D_1$ denotes the residue of an aromatic or heterocyclic diazo component which may contain a further azo group Z may be further defined as a group of the formula

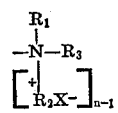

or the structural formulae as shown in column 3 of the specification.

Particularly interesting dyestuffs are those of formula (3)

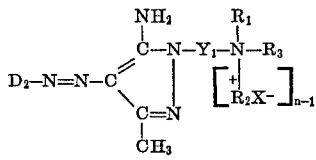

wherein $D_2$ denotes the residue of an aromatic diazo component of the benzene series or an at most bicyclic heterocyclic diazo component, $Y_1$ denotes a straight or branched aliphatic carbon chain having at most 6 carbon atoms, $R_1$ and $R_2$ each denotes hydrogen or an alkyl, aralkyl or cycloalkyl residue, $R_3$ denotes hydrogen or an alkyl, aralkyl, cycloalkyl or alkoxy residue or an amino group, and wherein N together with $R_1$ and/or $R_2$ and/or $R_3$ can form part of a heterocyclic ring, X denotes an anion and $n$ denotes 1 or 2.

The new dyestuffs can be manufactured according to the invention by amidation or condensation, coupling or quaternisation. The manufacture by amidation or condensation is characterised in that azo compounds of Formulae 1, 2 or 3, which instead of the amino, hydrazino or hydroxylamino group contain a reactive atom or group, for example a halogen atom or an ester grouping preferably derived from a strong inorganic oxygen-containing acid or from an aliphatic or aromatic sulphonic acid, for example a sulphato group or an arylsulphonyloxy or alkylsulphonyloxy group, bound via the alkylene bridge, for example the bridge Y or $Y_1$, are reacted with an amine, hydrazine or etherified hydroxylamine.

The manufacture by coupling is characterised in that diazotised amines of formulae D—NH$_2$, $D_1$NH$_2$ or $D_2$—NH$_2$ are coupled with the coupling components corresponding with the dyestuffs of Formulae 1 to 3 (hydrogen instead of D—N=N—, $D_1$—N=N— or $D_2$—N=N—).

In the manufacture by quaternisation, dyestuffs of Formulae 1 to 3 which contain a non-quaternised amino, hydrazino or etherified hydroxylamino group, are treated with quaternising agents, for example dyestuffs of Formula 3, wherein $n=1$ and $D_2$, $Y_1$, $R_1$ and $R_3$ have the significance indicated are reacted with compounds of formula $R_2X$, wherein X has the significance indicated and $R_2$ represents an alkyl, aralkyl or cycloalkyl residue.

The azo dyestuffs used in the manufacture by amidation or condensation are advantageously obtained by coupling diazotised amines, preferably of the aromatic or heterocyclic series, with the above defined coupling components. A recital of suitable diazo components is given below when describing the manufacture by coupling; the pyrazoles indicated below may also be used as coupling components, but in this case, in the place of the amino, hydrazino or etherified hydroxylamino group bound in the terminal position to the alkylene bridge in the 1-position, a replaceable atom or group, for example a chlorine atom or a sulphato group must be present. The dyestuffs manufactured from these components by coupling are reacted with amines, hydrazines or etherified hydroxylamines according to the invention. Compounds which are suitable for this reaction are particularly those which at the nitrogen atom or nitrogen atoms have hydrogen atoms, aliphatic residues which contain at most 4 carbon atoms and which may also contain ether bridges or hydroxyl groups, or cyclohexyl, benzyl or phenyl residues, or in which the nitrogen atom is a ring atom of a 5-membered or 6-membered saturated or unsaturated ring which may contain a nitrogen, oxygen or sulphur atom as a further hetero-atom and can also contain a condensed aromatic ring. The following for example may be mentioned as such compounds:

Amines.—primary and secondary amines for example ammonia, methylamine, ethylamine, isopropylamine, methoxyethylamine, methoxypropylamine, dimethylamine, diethylamine, methylphenylamine, ethylphenylamine, chlorethylamine, ethanolamine, diethanolamine, propanolamine, benzylamine or cyclohexylamine, morpholine, pyrrolidine, piperidine, piperazine, tertiary amines for example trimethylamine, triethylamine, triethanolamine, pyridine, picoline, lutidine, N-methyl-piperidine, N-methyl-piperazine, N-methylmorpholine, quinoline or pyrimidine.

Hydrazines.—N-methylhydrazine, N,N-dimethylhydrazine, N,N'-diethylhydrazine, N,N,N'-trimethylhydrazine, N,N,N',N'-tetramethylhydrazine, N-aminopiperidine, N-aminopyrrolidine and 1,5-diazabicyclo-(0,3,3)-octane.

Etherified hydroxylamines:

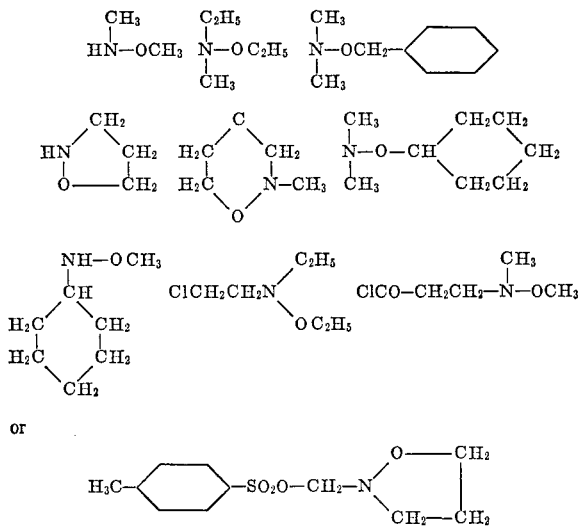

Compounds in which the alkylene bridge bound in the 1-position of the pyrazole contain a hetero-atom, especially an oxygen, sulphur or nitrogen atom, can also be manufactured by carrying out the condensation at the position of the hetero-atom, that is to say by reaction of an amine, hydrazine or hydroxylamine which contains a reactive atom or a reactive group bound via an alkylene bridge, for example an aminoethyl group or an ethylate group, with the corresponding dyestuff which in the 1-position of the pyrazole residue also contains a reactive atom or reactive group bound via an alkylene bridge, for example a chlorine atom or a methanesulphonyloxy group.

The reaction of the dyestuff which for example contains a halogen or a sulphatoalkyl group with the amine, hydrazine or etherified hydroxylamine can be carried out in a neutral solvent, for example in chlorobenzene, alcohols or aqueous alcohol mixtures or dimethylformamide, or also without solvents, advantageously at an elevated temperature in an excess of the hydroxylamine with or without the addition of catalysts, for example NaI.

In the manufacture by coupling, according to the invention, a diazotised amine may be coupled with an aminopyrazole, the coupling component already containing the amino, hydrazino or etherified hydroxylamino residue.

Examples of diazo compounds that may be particularly mentioned are aromatic compounds, for example those of the naphthalene and especially of the benzene series, which may contain as substituents especially halogen atoms or nitro, sulphonamide, phenyl, phenoxy or phenylazo groups or low molecular alkyl, halogenalkyl, alkoxy, alkylsulphonyl, N-alkylated sulphonamide or carboxylic acid alkyl ester groups in which the alkyl residue contains at most 4 aliphatically bound carbon atoms. Such diazo components preferably correspond to the formula

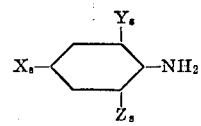

wherein $X_s$ denotes a hydrogen or halogen atom or a cyano, carbalkoxy, alkanesulphonyl, sulphonamide, phenylazo or nitro group, $Y_s$ denotes a hydrogen or halogen atom or a nitro, alkyl, alkoxy, trifluoromethyl, carbalkoxy or cyano group, and $Z_s$ denotes a hydrogen or halogen atom, at least one of the residues $X_s$ and $Y_s$ denoting a halogen atom or a nitro, carbalkoxy, cyano, alkylsulphonyl, sulphonamide or phenylazo group.

Amongst the diazo components of the benzene series the following may for example be mentioned:

aniline,
1-amino-3- or -4-chlorobenzene,
1-amino-4-bromobenzene,
1-amino-2-, -3- or -4-methylbenzene,
1-amino-2-, -3- or -4-nitrobenzene,
1-amino-4-cyanobenzene,
1-aminobenzene-3- or -4-methylsulphone,
1-amino-2-chlorobenzene-4-methylsulphone,
1-amino-2,5-dicyanobenzene,
1-amino-4-carbethoxybenzene,
1-amino-2,4- or -2,5-dichlorobenzene,
1-amino-2,4-dibromobenzene,
1-amino-2-methyl-4- or -6-chlorobenzene,
1-amino-2-trifluoromethyl-4-chlorobenzene,
1-amino-2-cyano-4-chlorobenzene,
1-amino-2-cyano-4-nitrobenzene,
1-amino-2-carbomethoxy-4-chlorobenzene,
1-amino-2-methanesulphonyl-4-chlorobenzene,
1-amino-2-carbomethoxy-4-nitrobenzene,
1-amino-2-phenoxy-4-nitrobenzene,
1-amino-2-chloro-4-cyanobenzene,
1-amino-2-chloro-4-nitrobenzene,
1-amino-2-methoxy-4-nitrobenzene,
1-amino-2-chloro-4-carbethoxybenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino-2,5- or -2,6-dichlorobenzene-4-sulphonic acid dimethylamide,
1-amino-2-chlorobenzene-4-sulphonic acid dimethylamide,
1-amino-2,6-dibromobenzene-4-sulphonic acid amide,
1-amino-2,4-dinitro-6-chloro- or -6-bromobenzene,
1-amino-2,4-dicyano-6-chlorobenzene,
1-amino-2,4,6-trichloro- or -tribromobenzene,
1-aminobenzene-3- or -4-sulphonic acid amide,
1-aminobenzene-3- or -4-sulphonic acid,
N-methyl- or -diethyl-amide,
4-amino-azobenzene,
4-amino-2'-chlorazobenzene,
4-amino-2',4'-dichlorazobenzene,
4-amino-3'-chloro-azobenzene,
4-amino-2'-nitro-azobenzene,
1-amino-4-nitrobenzene-2-methylsulphone,
1-amino-benzene-4-carboxylic acid β-methoxyethyl ester,
4-amino-3-nitro-azobenzene,
4-amino-3'-nitro-azobenzene,
4-amino-2-methyl-azobenzene,
4-amino-4'-methoxy-azobenzene,
4-amino-3-nitro-2'-chlor-azobenzene,
4-amino-3-nitro-4'-chlor-azobenzene,
4-amino-3-nitro-2',4'-dichlor-azobenzene,
4-amino-3-nitro-4'-methoxy-azobenzene,
4-aminodiphenyl and 2- or 4-aminodiphenylether.

Any desired diazotisable heterocyclic amines which do not contain any acid substituents conferring solubility in water are also suitable as diazo components, but especially the amines which possess a heterocyclic 5-membered ring with 2 or 3 hetero-atoms, particularly one nitrogen atom and one or two sulphur, oxygen or nitrogen atoms as hetero-atoms.

The heterocyclic diazo components may also contain the substituents mentioned in the case of the aromatic diazo components. They can for example belong to the pyridine, pyrazole, imidazole, triazole, tetrazole, oxazole, thiazole, selenazole, oxdiazole, thiadiazole, pyrimidine, triazine, quinoline, indazole, benzimidazole, naphthimidazole, benzoxazole, naphthoxazole, benzthiazole, naphthothiazole, or benzoselenazole series. The following may be mentioned as examples:

2-aminothiazole,
2-amino-5-nitrothiazole,
2-amino-5-methylsulphonyl-thiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
3-aminopyridine,
3-aminoquinoline,
3-aminopyrazole,
3-amino-1-phenylpyrazole,
3-aminoindazole,
3-amino-1,2,4-triazole,
3-amino-1-(4'-methoxyphenyl)-pyrazole,
2-aminobenzthiazole,
2-amino-6-methylbenzthiazole,
2-amino-6-methoxybenzthiazole,
2-amino-6-chlorobenzthiazole,
2-amino-6-cyanobenzthiazole,
2-amino-6-nitrobenzthiazole,
2-amino-6-carbethoxybenzthiazole,
2-amino-6-methylsulphonylbenzthiazole,
2-amino-1,3,4-thiadiazole,
2-amino-1,3,5-thiadiazole,
2-amino-4-phenyl- or -4-methyl-1,3,5-thiadiazole and
2-amino-5-phenyl-1,3,4-thiadiazole.

Heterocyclic diazo components of the thiazole, thiadiazole and benzthiazole series are preferred.

The pyrazoles used as coupling components preferably contain in the 5-position a primary amino group or an amino group substituted by aliphatic residues containing at most 4 carbon atoms such as lower alkyl. They contain the optionally quaternised amino, hydroxylamino or hydrazino group bound in the 1-position via a straight or branched aliphatic carbon bridge containing at most 6 carbon atoms which may also contain hetero-atoms for example oxygen, sulphur or nitrogen. The following for example may be mentioned as such coupling components:

1-β-aminoethyl-5-aminopyrazole,
1-β-aminoethyl-3-methyl-5-aminopyrazole,
1-β-dimethylaminoethyl-3-methyl-5-aminopyrazole,
1-β-aminoethoxyethyl-3-methyl-5-aminopyrazole,
1-β-aminoethyl-5-N-methylaminopyrazole,
1-γ-aminobutyl-3-methyl-5-aminopyrazole,
1-β-aminoethylaminoethyl-3-methyl-5-aminopyrazole,
1-β-aminoethyl-3-phenyl-5-aminopyrazole,
1-γ-aminopropyl-3-ethyl-5-aminopyrazole,
1-β-aminoethyl-3-methoxy-5-aminopyrazole, as well as the corresponding 5-aminopyrazoles which contain a hydrazino or etherified hydroxylamino group instead of the terminal amino group on the alkylene bridge bound in the 1-position of the aminopyrazole. Included in the expression amino, hydrazino or etherified hydroxylamino group are to be understood, not only the derivatives of ammonia, hydrazine or methoxyamine, but quite generally the residues derived from the primary, secondary, tertiary or quaternary nitrogen compounds mentioned above. The manufacture of such pyrazoles may for example be effected by reacting nitriles, for example diacetonitrile, with hydrazines, for example 2-aminoethylhydrazine.

Instead of a single diazo component a mixture of two or more of the diazo components may be used according to the invention and instead of a single coupling component a mixture of two or more of the coupling components may also be used according to the invention.

The diazotisation of the diazo components mentioned above can be effected according to known methods, for example with an inorganic acid, especially hydrochloric acid, and sodium nitrite, or for example by means of a solution of nitrosylsulphuric acid in concentrated sulphuric acid.

The coupling can also be effected in known manner, for example in a neutral to acid medium, if desired in the presence of sodium acetate or similar buffer substances which influence the rate of coupling, or of catalysts, for example pyridine or its salts.

Those of the new dyestuffs which contain a quaternised amino, hydrazino or etherified hydroxylamino group can also be obtained according to a third manufacturing process, by quaternising the corresponding dyestuffs which contain a non-quaternated amino, hydrazino or etherified hydroxylamino group, by treatment with alkylating agents. As such alkylating or quaternising agents the following for example may be used: esters of strong inorganic or organic sulphonic acids, for example dimethyl sulphate, diethyl sulphate, alkyl halides, for example methyl chloride, bromide or iodide, aralkyl halides, for example benzyl chloride, esters of low molecular alkane sulphonic acids, for example methyl esters of methane sulphonic, ethane sulphonic or butane sulphonic acid, and esters of benzene sulphonic acids which may contain additional substituents, for example methyl, ethyl, propyl or butyl esters of benzene sulphonic acid, 2- or 4-methylbenzene sulphonic acid, 4-chlorobenzene sulphonic acid or 3- or 4-nitrobenzene sulphonic acid.

The alkylation advantageously takes place by warming in an inert organic solvent, for example hydrocarbons, for example benzene, toluene or xylene, halogenated hydrocarbons for example carbon tetrachloride, tetrachlorethane, chlorobenzene or o-dichlorobenzene, or nitro-hydrocarbons for example nitromethane, nitrobenzene or nitronaphthalene. Acid anhydrides, acid amides or nitriles for example acetic anhydride, dimethylformamide or acetonitrile, or also dimethylsulphoxide, can also be employed as solvents in the alkylation. Instead of a solvent a large excess of alkylating agent can also be used. In this case it is essential to ensure that the mixture does not become over-heated since the reaction is strongly exothermic. Nevertheless it is necessary in most cases, especially in the presence of organic solvents, to heat the reaction mixture externally in order to start the reaction. In special cases the alkylation can also be effected in an aqueous or alcoholic medium, if desired in the presence of small amounts of potassium iodide.

During the alkylation other nitrogen atoms can naturally also be quaternised depending on the conditions, for example those which are present as ring atoms in the residue of a heterocyclic diazo component. Here it is particularly necessary to mention those dyestuffs in which the quaternisable ring nitrogen atom is linked to the amino group in the 5-position of the pyrazole by an uninterrupted chain of conjugated double bonds and is preferably adjacent to the ring carbon atom carrying the azo bridge.

The dyestuffs of the last-mentioned type, that is to say those in which the ring nitrogen atom is adjacent to the ring carbon atom carrying the azo bridge, can also be manufactured by oxidative coupling, that is to say by reaction of the hydrazone (instead of the diazotised amine)

with the coupling component in the presence of oxidising agents in accordance with the reaction scheme:

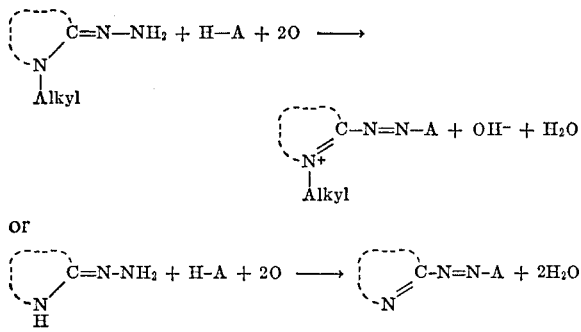

wherein A denotes the residue of the coupling component.

When purification is necessary, the dyestuff salts are advantageously purified by dissolving in water, whereupon any unreacted starting dyestuff can be filtered as an insoluble residue. The dyestuff can again be precipitated from the aqueous solution by adding water-soluble salts, for example sodium chloride.

The quaternised dyestuffs obtained in accordance with the process preferably contain as the anion the residue of a strong inorganic acid, for example of hydrochloric acid, sulphuric acid or phosphoric acid, or the residue of a sulphuric acid semi-ester, the residue of a sulphonic acid or the residue of a carboxylic acid. The anions mentioned which are introduced into the dyestuff molecule in accordance with the invention, can also be replaced by anions of other inorganic acids, for example of phosphoric acid, sulphuric acid, or organic acids, for example formic acid, lactic acid or tartaric acid; in certain cases the free bases can also be used. The dyestuff salts can also be used in the form of double salts, for example with halides of the elements of the second group of the Periodic System, especially zinc chloride or cadmium chloride.

The dyestuffs or dyestuff salts obtained in accordance with the invention which may contain a quaternised amino, hydrazino or etherified hydroxylamino group are suitable for dyeing and printing a wide variety of fully synthetic fibres, for example polyvinyl chloride, polyamide or polyurethane fibres, and also fibres of polyesters of aromatic dicarboxylic acids, for example polyethylene terephthalate fibres, but especially polyacrylonitrile fibre materials or polyvinylidene cyanide fibres (Darvan), as well as anionically modified fully synthetic polyamide and polyester fibres. The term "polyacrylonitrile fibres" is to be understood to include all polymers which contain more than 80%, for example 80 to 95%, of acrylonitrile together with 5 to 20% of vinyl acetate, vinylpyridine, vinyl chloride, vinylidene chloride, acrylic acid, acrylic acid esters, methacrylic acid, methacrylic acid esters and the like. These products are for example sold under the following trade names: "Acrilan 1656" (The Chemstrand Corporation, Decatur, Alabama, U.S.A.), "Acrilan 41" (The Chemstand Corporation), "Creslan" (American Cyanamid Company), "Orlon 44" (Du Pont), "Crylor HH" (Soc. Rhodiaceta SA, France), "Leacril N" (Applicazioni Chimice Società per Azioni, Italy), "Dynel" (Union Carbide Chem. Corp.), "Exlan" (Japan Exlan Industry Co., Japan), "Vonnel" (Mitsubishi, Japan), "Verel" (Tennessee Eastman, U.S.A.), "Zefran" (Dow Chemical, U.S.A.), "Wolcrylon" (Filmfabrik Agfa, Wolfen), "Ssaniw" (U.S.S.R.) and also "Orlon 42," "Dralon," "Courtelle" and the like.

On these fibres, which can also be dyed in admixture, the new dyestuffs yield intense and level dyeings of good light fastness and good general fastness properties, especially good fastness to washing, perspiration, sublimation, creasing, decatising, ironing, rubbing, carbonisation, water, chlorine water, seawater, dry cleaning, cross-dyeing and solvents. The new dyestuffs according to the invention also possess inter alia a good stability over a wide pH range, good affinity and good building-up capacity, for example in aqueous solutions of different pH-values, and good fastness to bucking. Furthermore the new dyestuffs generally resist well on wool and other natural polyamide fibres, as well as on cotton.

The quaternised water-soluble dyestuffs are generally of low sensitivity to electrolytes and in part show an exceptionally good solubility in water or polar solvents. Dyeing with the quaternised water-soluble dyestuffs is in general carried out in an aqueous neutral or acid medium, at the boiling temperature under atmospheric pressure or in a closed vessel at elevated temperature and pressure. The commercially available levelling agents are not harmful but are not necessary.

The dyestuffs mentioned are also particularly suitable for three-colour dyeing. Furthermore, because of their resistance to hydrolysis, they can advantageously be used for high temperature dyeing and for dyeing in the presence of wool. They can also be applied to the fibrous materials by printing. For this purpose for example, a printing paste is used which contains the dyestuff together with the auxiliary substances customary in printing. They are furthermore suitable for the bulk dyeing of polymerisation products of acrylonitrile and other plastic compositions which may be dissolved, to give shades fast to light and washing, and also for colouring oil paints or lacquers, or for dyeing mordanted cotton. Because of their good levelling properties they are particularly suitable for carpet dyeing.

The new water-insoluble or sparingly water-soluble dyestuffs manufactured according to the invention, which contain a non-quaternised amino, hydrazino or etherified hydroxylamino group, are advantageously used in a finely divided form and with the addition of dispersing agents, for example soap, sulphite cellulose waste lye or synthetic detergents, or a combination of different wetting and dispersing agents. As a rule it is advantageous before dyeing to convert these dyestuffs into a dyeing preparation which contains a dispersing agent and a finely divided dyestuff in such a form that on dilution of the dyestuff preparations with water a fine dispersion is formed. Such dyestuff preparations can be obtained in a known manner, for example by grinding the dyestuff in high efficiency grinding devices in a dry or wet form with or without addition of dispersing agents during the grinding process. They are also suitable for dyeing and printing a wide variety of semi-synthetic and fully synthetic fibres, for example cellulose acetate, polyolefines, for example modified polypropylene, polyester, polyvinyl chloride, polyamide or polyurethane fibres, but especially polyacrylonitrile fibres.

In order to obtain intense dyeings it is advantageous to effect the dyeing process at higher temperatures, for example at the boiling point. It is advantageous to add a dispersing agent and to render the dyebath weakly acid, for example by adding a weak acid, for example acetic acid.

The new dyestuffs containing a non-quaternised amino, hydrazino or etherified hydroxylamino group are also suitable for dyeing from organic solvents, for example for the continuous dyeing of polyacrylonitrile or polyester fibres from chlorinated aliphatic hydrocarbons which may contain for example 10% of dimethylformamide.

The present dyestuffs can also be applied by printing. For this purpose a printing paste is for example used which contains the finely dispersed dyestuff which may be mixed with other dyestuffs, together with the auxiliary substances generally used in printing, for example wetting agents and thickeners.

In the examples which follow the parts denote parts by weight, and the percentages denote percentages by weight, unless otherwise stated.

EXAMPLE 1

7.6 parts of sodium nitrite are introduced into 136 parts of sulphuric acid monohydrate at 10 to 15° C. and dissolved. 16.3 parts of 2-amino-5-nitrobenzonitrile are thereafter introduced into the solution which is stirred for 2 hours at 20 to 25° C. The reaction mixture is poured on to 600 parts of ice water and filtered. The excess nitrous acid is destroyed by adding sulphamic acid and the diazo solution thus obtained is added at 0 to 5° C. to a solution of 1-(2'-amino)-ethyl-5-aminopyrazole in 200 parts by volume of water. After completion of the coupling the mixture is neutralised with sodium hydroxide solution. The precipitated dyestuff of the formula

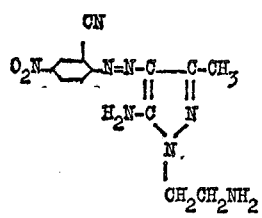

is filtered, washed with water and dried. It dyes polyacrylonitrile fibres orange shades of excellent fastness properties.

The coupling component may be obtained by condensing 2-aminoethylhydrazine with diacetonitrile in aqueous acid solution.

Dyeing instruction.—1 part of the dyestuff obtained according to Example 1, 1 part of a neutralised reaction product (50% concentration) of 1 mol of a higher alkylamine having about 20 carbon atoms with 30 mols of ethylene oxide, 1 part of concentrated acetic acid and 7 parts of water are ground in a ball mill to give a fine dispersion.

The dyestuff preparation described above is added to a dyebath of 400 parts of water and 4 parts of a 50% solution of a condensation product of 1 mol of 1-methyl-2-heptadecylbenzimidazole and 7 mols of ethylene oxide adjusted to a pH-value of 4 with acetic acid. 100 parts of well-wetted polyacrylonitrileflock are introduced, the bath is heated to boiling during 30 minutes and dyeing carried out for 1½ hours at the boiling point. The dyed material is subsequently well rinsed. A level orange dyeing of very good fastness to rubbing is obtained.

The same process yields dyestuffs which dye polyacrylonitrile fibres in the shades given in column III of the table below, when the diazo components given in column I are diazotised and coupled with the coupling components quoted in column II.

| I | II | III |
|---|---|---|
| $O_2N-\langle\rangle-NH_2$ with Cl | $HC=C-CH_3$, $H_2N-C$, $N$, $CH_2CH_2NH_2$ (pyrazole) | Orange. |
| $O_2N-$benzothiazole-$C-NH_2$ | Same as above | Do. |
| phenyl-imidazole-$C-NH_2$ (with N, S) | do | Yellow. |
| $CH_3SO_2-\langle\rangle-NH_2$ with Cl | $HC=C-CH_3$, $H_2N-C$, $N$, $CH_2CH_2N(C_2H_5)_2$ | Do. |
| $\langle\rangle-N=N-\langle\rangle-NH_2$ | Same as above | Yellowish orange. |
| $O_2N-C=N$, $C-NH_2$ (with S) | do | Scarlet. |
| $CH_3-\langle\rangle-NH_2$ with $NO_2$ | $HC=C-CH_3$, $H_2N-C$, $N$, $CH_2CH_2CH_2N(CH_3)_2$ | Yellow. |
| $H_3COOC-\langle\rangle-NH_2$ | Same as above | Do. |
| $\langle\rangle-N=N-\langle\rangle-NH_2$ with $CH_3$, $CH_3$ | $HC=C-CH_3$, $H_2N-C$, $N$, $CH_2CHCH_2N(CH_3)_2$, $CH_3$ | Orange. |
| $NC-C=N$, $C-NH_2$ (with S) | $HC=C-CH_3$, $H_2N-C$, $N$, $CH_2CH_2OCH_2CH_2CH_2N(C_2H_5)_2$ | Scarlet |

TABLE—Continued

| I | II | III |
|---|---|---|
| 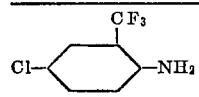 | 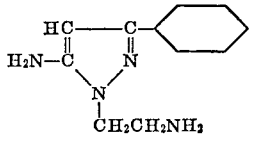 | Yellow. |
| 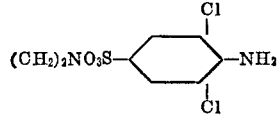 | Same as above | Do. |
| 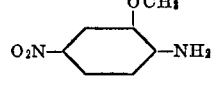 | 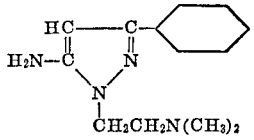 | Orange. |
| 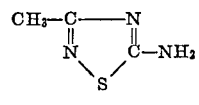 | Same as above | Yellow. |
| 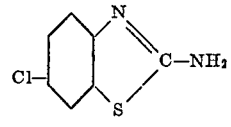 | 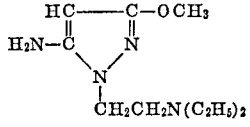 | Orange. |
| 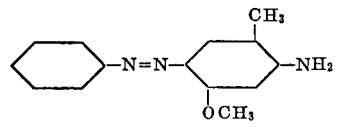 | Same as above | Do. |

EXAMPLE 2

2.28 parts of sodium nitrate are sprinkled at 0° C. to 10° C. into 27 parts of concentrated sulphuric acid. The mixture is heated to 65° C. until all has dissolved, cooled to 0° C., and 30 parts by volume of a mixture of glacial acetic acid and propionic acid (in the ratio of 4:1) are added dropwise. A solution of 4.35 parts of 2-amino-5-nitrothiazole in 30 parts by volume of a mixture of glacial acid and propionic acid (4:1) is added dropwise to the resulting solution and the reaction mixture is further stirred for 3 hours at 0° C. to 5° C. 2.28 parts of urea are added to this diazo solution in portions. The diazo solution thus obtained is added to a solution of 4.23 parts of 1-β-hydroxyethyl-3-methyl-5-aminopyrazole in 50 parts of water at 0 to 5° C. The mixture is stirred for about a further 10 hours. After completion of the coupling the precipitated dyestuff is filtered, washed with water until neutral and dried.

5.94 parts of the dyestuff thus obtained are dissolved in 100 parts of anhydrous pyridine, 3.4 parts of methanesulphochloride are added dropwise at 0 to 5° C. and the mixture is stirred for a further 24 hours at 0 to 5° C. The mixture is poured into 1500 parts of water. The precipitated methanesulphonic ester is filtered, washed with water and dried.

3.75 parts of the methanesulphonic ester thus obtained are heated for 6 hours to 80° C. with 15 parts of pyridine. The mixture is evaporated in a rotatory evaporator. The residue is dissolved in hot water with the addition of acetic acid and the solution is filtered. The dyestuff is then salted out of the filtrate by means of sodium chloride and zinc chloride. The precipitated dyestuff of the formula

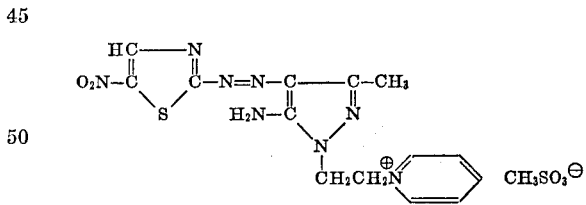

is filtered and washed with 15% sodium chloride solution. It dyes polyacrylonitrile fibres red shades having very good fastness properties.

When the deystuffs mentioned in column 1 of the table below are reacted with the tertiary bases mentioned in column II, in accordance with the data of Example 1, paragraph 3, then dyestuffs containing the anion mentioned in column III are obtained whcih dye polyacrylonitrile fibres the shades given in column IV.

| I | II | III | IV |
|---|---|---|---|
| 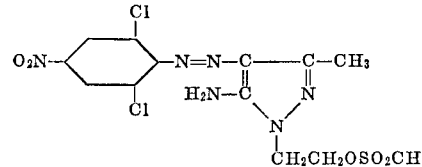 |  | $CH_3SO_3$ | Orange. |

TABLE—Continued

| I | II | III | IV |
|---|---|---|---|
| (structure: 2-Cl-4-O₂N-phenyl-N=N-C(C-CH₃)(H₂N-C-N)-N-CH₂CH(CH₃)OSO₂CH₃) | pyridine | CH₃SO₃ | Orange. |
| (structure: 2-CN-4-O₂N-phenyl-N=N-C(C-CH₃)(H₂N-C-N)-N-CH₂CH₂OSO₂CH₃) | Same as above | CH₃SO₃ | Do. |
| (structure: phenyl-thiadiazole-C-N=N-C(C-CH₃)(H₂N-C-N)-N-CH₂CH₂OSO₂CH₃) | ...do... | CH₃SO₃ | Yellow. |
| (structure: 2-Cl-4-CH₃SO₂-phenyl-N=N-C(C-CH₃)(H₂N-C-N)-N-CH₂CH₂OSO₂CH₃) | ...do... | CH₃SO₃ | Do. |
| (structure: pyridyl-N=N-C(C-CH₃)(H₂N-C-N)-N-CH₂CH(CH₃)OSO₂CH₃) | ...do... | CH₃SO₃ | Do. |
| (structure: 2-NO₂-4-O₂N-phenyl-N=N-C(C-CH₃)(H₂N-C-N)-N-CH₂CH₂OSO₂-phenyl) | N(CH₃)₃ | cyclohexyl-SO₃ | Reddish orange. |
| (structure: methylbenzothiazole-C-phenyl-N=N-C(C-CH₃)(H₂N-C-N)-N-CH₂CH₂OSO₂-phenyl) | N(CH₃)₃ | Same as above | Orange. |
| (structure: 2-CN-4-Cl-phenyl-N=N-C(C-CH₃)(H₂N-C-N)-N-CH₂CH₂Br) | N(CH₃)₃ | Br | Do. |
| (structure: 4-Br-phenyl-N=N-C(C-phenyl)(H₂N-C-N)-N-CH₂CH(CH₃)-OSO₂-C₆H₄-CH₃) | N(C₂H₅)₃ | CH₃-C₆H₄-SO₃ | Yellow. |

| I | II | III | IV |
|---|---|---|---|
| (structure) | N(C₂H₅)₃ | CH₃-⌬-SO₂ | Yellow. |
| (structure) | H₂NN(CH₃)₂ | CH₃SO₃ | Orange. |
| (structure) | H₂NN(CH₃)₂ | CH₃SO₃ | Yellow. |
| (structure) | H₂NN(C₂H₅)₂ | CH₃SO₃ | Orange. |
| (structure) | C₄H₉-N-OC₄H₉ with C₄H₉ | CH₃-⌬-SO₂ | Yellow. |
| (structure) | C₂H₅-N-OC₂H₅ with C₂H₅ | Br | Orange. |

EXAMPLE 3

6 parts of 1-(β-methanesulphonyloxy)-ethyl-3-methyl-5-amino-4-(2'-chloro-4'-nitrophenylazo)-pyrazole and 30 parts of piperidine are heated for 5 hours at 80° C. The reaction mixture is cooled and poured into 600 parts of water. The precipitated dyestuff of the formula

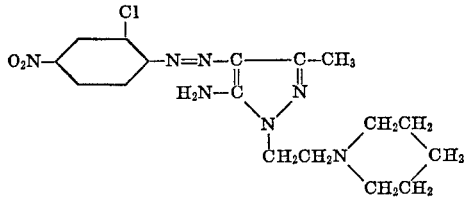

is filtered, washed with water and dried. It dyes polyacrylonitrile fibres orange shades having very good fastness properties.

When the dyestuffs mentioned in column I of the table below are reacted in the same manner with the secondary or primary amines given in column II, then dyestuffs are obtained which dye polyacrylonitrile fibres the shades given in column III.

| I | II | III |
|---|---|---|
| (structure with CH₃SO₂) | piperidine (HN with CH₂-CH₂/CH₂-CH₂/CH₂) | Yellow. |
| (structure with CF₃, O₂N) | Same as above | Reddish yellow. |

TABLE—Continued

| I | II | III |
|---|---|---|
| (4-methylbenzothiazol-2-yl)–C₆H₄–N=N–C(C–CH₃)=... with H₂N–C, N–CH₂CH₂OSO₂–C₆H₅ substituents | HN(CH₂CH₂)₂O (morpholine) | Orange. |
| 2,5-dichloro-4-nitrophenyl–N=N–C(–C–CH₃)... H₂N–C, N–CH₂CH₂OSO₂–C₆H₄–CH₃ | Same as above | Do. |
| (CH₃)₂NO₂S–C₆H₄–N=N–C(–C–CH₃)... H₂N–C, N–CH₂CH₂Br | HN(CH₂CH₂)₂ (pyrrolidine) | Yellow. |
| H₅C₂OOC–C₆H₄–N=N–C(–C–CH₃)... H₂N–C, N–CH₂CH₂Br | Same as above | Do. |
| (5-nitrothiazol-2-yl)–N=N–C(–C–CH₃)... H₂N–C, N–CH₂CH₂Br | HN(CH₃)₂ | Scarlet. |
| 2,4-dinitrophenyl–N=N–C(–C–CH₃)... H₂N–C, N–CH₂CH₂OSO₂CH₃ | HN(CH₃)₂ | Reddish orange. |
| 4-chloro-2-(trifluoromethyl)phenyl–N=N–C(–C–C₆H₅)... H₂N–C, N–CH₂CH₂OSO₂CH₃ | HN(C₄H₉)₂ | Yellow. |
| (5-phenyl-1,3,4-thiadiazol-2-yl)–N=N–C(–C–CH₃)... H₂N–C, N–CH₂CH₂OSO₂–C₆H₅ | HN(C₂H₅)(OC₂H₅) | Do. |
| H₂NO₂S–naphthyl–N=N–C(–C–CH₃)... H₂N–C, N–CH₂CH₂OSO₂–C₆H₄–CH₃ | CH₃CH₂CH₂NH₂ | Orange. |
| C₆H₅–N=N–C₆H₄–N=N–C(–C–CH₃)... H₂N–C, N–CH₂CH₂OSO₂–C₆H₄–CH₃ | C₆H₅–CH₂NH₂ | |

TABLE—Continued

| I | II | III |
|---|----|-----|
| 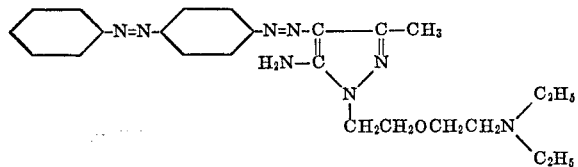 | CH₂—CH₂<br>CH₂   CH—NH₂<br>CH₂—CH₂ | Yellow. |
| | ⬡—NH₂ | Do. |

EXAMPLE 4

0.76 part of sodium metal are adde in portions whilst cooling to a solution of 3.51 parts of diethylaminoethanol in 15 parts of toluene. The suspension is stirred until the reaction is ended and excess sodium is separated from the reaction mixture. A solution of 6.4 parts of 1-(β-methanesulphonyloxy)-ethyl-3-methyl-5-amino-4(4'-phenylazophenylazo)-pyrazole in 50 parts of toluene is added to the sodium diethylaminoethylate obtained as above. The reaction mixture is stirred for 6 hours at 95 to 100° C. The toluene is distilled in steam and the residue is rendered acid with acetic acid, boiled with water, and the resulting suspension filtered hot. The filtrate is rendered weakly alkaline with sodium carbonate solution. The precipitated dyestuff of the formula

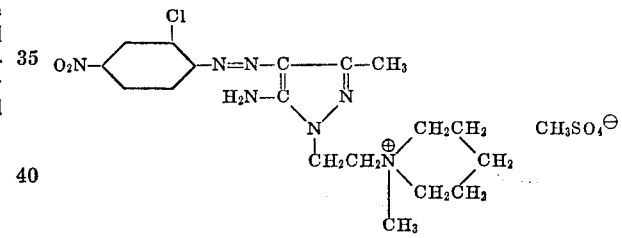

is filtered, washed with water and dried. It dyes polyacrylonitrile fibres yellowish-orange shades having very good fastness properties.

EXAMPLE 5

3.92 parts of the dyestuff obtained according to Example 3 are dissolved in 25 parts of warm chlorobenzene. A solution of 1.9 parts of dimethyl sulphate in 5 parts of chlorobenzene is added dropwise. The reaction mixture is stirred for 4 hours at 95° C. and then cooled. The suspension is filtered. The filtere cake is dissolved in hot water, the solution is filtered, and the dyestuff is salted out of the filtrate. The precipitated dyestuff of the formula $$O_2N-\text{⬡}(Cl)-N=N-C(=C-CH_3)(H_2N-C=N)-N-CH_2CH_2-\overset{\oplus}{N}(CH_2CH_2)(CH_2CH_2)(CH_3)CH_2 \quad CH_3SO_4^{\ominus}$$

is filtered. It dyes polyacrylonitrile fibres orange shades having very good fastness properties.

When the dyestuffs mentioned in column I of the table below are quaternised in the same manner with the alkylating agents mentioned in column II, dyestuffs containing the anion mentioned in column III are obtained which dye polyacrylonitrile fibres the shades given in column IV.

| I | II | III | IV |
|---|----|-----|----|
| O₂N—⬡(CN)—N=N—C(—C—CH₃)(H₂N—C=N)—N—CH₂CH₂N(CH₂CH₂)(CH₂CH₂)CH₂ | (CH₃)₂SO₄ | CH₃SO₄ | Orange. |
| H₃COC—⬡—N=N—C(—C—CH₃)(H₂N—C=N)—N—CH₂CH₂N(CH₂CH₂)(CH₂CH₂)CH₂ | C₄H₉Br | Br | Yellow. |
| O₂N—⬡(OCH₃)—N=N—C(—C—CH₃)(H₂N—C=N)—N—CH₂CH₂N(CH₂CH₂)(CH₂CH₂)CH₂ | HOCH₂CH₂Br | Br | Orange. |

TABLE—Continued

| I | II | III | IV |
|---|---|---|---|
| [4-O2N, 2-SO2CH3-phenyl]-N=N-C(NH2)=C(CH3)-N(CH2CH2N(CH2CH2)2O)-N (triazole ring) | CH3-C6H4-SO2OCH3 | CH3-C6H4-SO3 | Orange. |
| [4-O2N, 2,6-diCl-phenyl]-N=N-C(NH2)=C(CH3)-N(CH2CH2N(C2H5)2)-N | C6H5-CH2Cl | Cl | Do. |
| [7-H5C2O-benzothiazol-2-yl]-C(=N-)-N=N-C(NH2)=C(OCH3)-N(CH2CH2N(C2H5)2)-N | C6H5-SO2OCH3 | C6H5-SO3 | Do. |
| [2-NO2, 4-CH3-phenyl]-N=N-C(NH2)=C(C6H5)-N(CH2CH(CH3)CH2N(CH3)2)-N | CH3I | I | Yellow. |
| [4-Br-phenyl]-N=N-C(NH2)=C(CH3)-N(CH2CH2N(C4H9)2)-N | (CH3)2SO4 | CH3SO4 | |
| C6H5-N=N-C6H4-N=N-C(NH2)=C(CH3)-N(CH2CH2OCH2CH2N(C2H5)2)-N | CH3I | I | Yellowish. |
| [4-O2N, 2,6-diCl-phenyl]-N=N-C(NH2)=C(CH3)-N(CH2CH2N(OC2H5)(C2H5))-N | (C2H5)2SO4 | C2H5SO4 | Orange. |
| [2,4-di-NO2-phenyl]-N=N-C(NH2)=C(CH3)-N(CH2CH2NHCH2CH3)-N | (CH3)2SO4 | CH3SO4 | Reddish orange. |
| [4-CH3O2S-phenyl]-N=N-C(NH2)=C(CH3)-N(CH2CH2NHCH2-C6H5)-N | (CH3)2SO4 | CH3SO4 | Yellow. |
| [4-O2N, 2-CN-phenyl]-N=N-C(NH2)=C(CH3)-N(CH2CH2NH2)-N | (CH3)2SO4 | CH3SO4 | Orange. |

| I | II | III | IV |
|---|---|---|---|
| 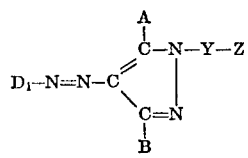 | $(CH_3)_2SO_4$ | $CH_3SO_4$ | Orange. |

I claim:

1. Basic azo dyestuff of the formula

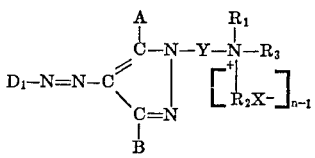

wherein Z is selected from the group consisting of the formula

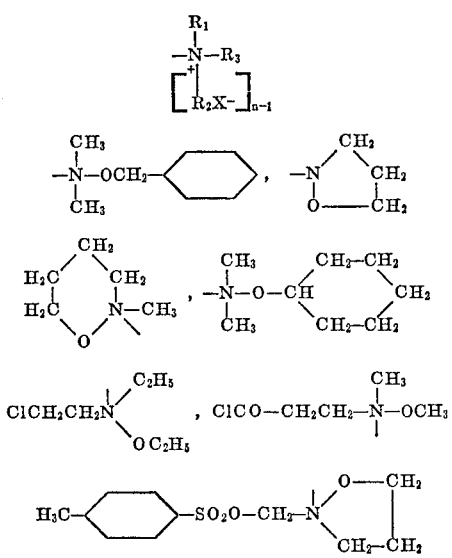

wherein $R_1$ and $R_2$ each represent hydrogen, $C_{1-4}$ alkyl, phenyl, benzyl, $C_{2-3}$ hydroxyalkyl, chloroethyl or cyclohexyl; $R_3$ represents hydrogen, hydroxyethyl, $C_{1-2}$ alkyl, $C_{1-4}$ alkoxy, benzyl, cyclohexyl, amino, $C_{1-2}$ alkylamino, $C_{1-2}$ dialkylamino, N-piperidylamino, N-pyrrolidinyl-amino and wherein N together with $R_1$, $R_2$ and $R_3$ forms pyridine, and wherein N together with $R_1$ and $R_2$ forms piperidine, pyrrolidine or morpholine, X represents an anion, $n$ denotes 1 or 2; Y represents an alkylene chain of up to 6 carbon atoms which may be interrupted by a hetero-atom selected from the group consisting of

—O— or —S—; A represents amino; B represents hydrogen, $C_{1-2}$ alkyl, methoxy or phenyl; and $D_1$ is selected from the group consisting of a group of the formula

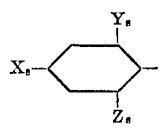

wherein $Y_s$ is hydrogen, chloro, bromo, methyl, nitro, cyano, methylsulfonyl, trifluoromethyl, carbomethoxy, phenoxy, or methoxy $X_s$ is hydrogen, chloro, bromo, methyl, nitro, cyano, methylsulfonyl, carboethoxy, sulfonamido, N-$C_{1-2}$ alkylsulfonamido, N,N-dimethylsulfonamido, phenylazo, chlorophenylazo, dichlorophenylazo, nitrophenylazo, methylphenylazo, carboxy, carbomethoxyethyl, phenoxy, acetyl or ethoxycarbonyl, and $Z_s$ is hydrogen, chloro or bromo; sulfonamidonaphthyl, thiazolyl, nitrothiazolyl, methylsulfonylthiazolyl, cyanothiazolyl, methylthiazolyl, phenylthiazoly, chlorophenylthiazolyl, thiadiazolyl, phenylthiadiazolyl, methylthiadiazolyl, pyridyl, quinolinyl, indazolyl, triazolyl, pyrazolyl, phenylpyrazolyl, methoxyphenylpyrazolyl, benzthiazolyl, methylbenzthiazolyl, methoxybenzthiazolyl, chlorobenzthiazolyl, cyanobenzthiazolyl, nitrobenzthiazolyl, carboethoxybenzthiazolyl and methylsulfonylbenzthiazolyl.

2. Basic azo dyestuffs as claimed in claim 1, wherein X denotes —Cl, —Br, —I, $=SO_4$, —$SO_3$—$CH_3$, —$SO_3$-phenyl, methylphenyl-$SO_3$— or —$SO_3O$—$C_{1-2}$ alkyl.

3. Basic azo dyestuff of the formula

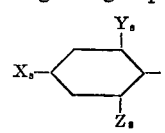

wherein $R_1$ and $R_2$ each represents hydrogen, $C_{1-4}$ alkyl, phenyl, benzyl, $C_{2-3}$ hydroxyalkyl, chloroethyl or cyclohexyl; $R_3$ represents hydrogen, hydroxyethyl, $C_{1-2}$ alkyl, $C_{1-4}$ alkoxy, benzyl, cyclohexyl, amino, $C_{1-2}$ alkylamino, $C_{1-2}$ dialkylamino, N-piperidylamino, N-pyrrolidinylamino and wherein N together with $R_1$, $R_2$ and $R_3$ forms pyridine, and wherein N together with $R_1$ and $R_2$ forms piperidine, pyrrolidine, or morpholine, X represents an anion, $n$ denotes 1 or 2; Y represents an alkylene chain of up to 6 carbon atoms which may be interrupted by a hetero-atom selected from the group consisting of

—N(H)—

—O— or —S—; A represents amino; B represents hydrogen, $C_{1-2}$ alkyl, methoxy or phenyl; and $D_1$ is selected from the group consisting of a group of the formula wherein $Y_s$ is hydrogen, chloro, bromo, methyl, nitro, cyano, methylsulfonyl, trifluoromethyl, carbomethoxy, phenoxy or methoxy; $X_s$ is hydrogen, chloro, bromo, methyl, nitro, cyano, methylsulfonyl, carboethoxy, sulfonamido, N-$C_{1-2}$ alkylsulfonamido, N,N-dimethylsulfonamido, phenylazo, chlorophenylazo, dichlorophenylazo, nitrophenylazo, methylphenylazo, carboxy, carbomethoxyethyl, phenoxy, acetyl or ethoxycarbonyl, and $Z_s$ is hydrogen, chloro or bromo; sulfonamidonaphthyl, thiazolyl, nitrothiazolyl, methylsulfonylthiazolyl, cyanothiazolyl, methylthiazolyl, phenylthiazolyl, chlorophenylthiazolyl, thiadiazolyl, phenylthiadiazolyl, methylthiadiazolyl, pyridyl, quinolinyl, indazolyl, triazolyl, pyrazolyl, phenylpyrazolyl, methoxyphenylpyrazolyl, benzthiazolyl, methylbenzthiazolyl, methoxybenzthiazolyl, chlorobenzthiazolyl, cyanobenzthiazolyl, nitrobenzthiazolyl, carboethoxybenzthiazolyl and methylsulfonylbenzthiazolyl.

4. A basic azo dyestuff of the formula

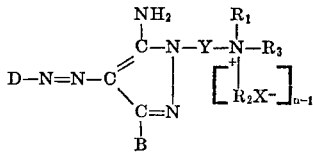

wherein Y represents an aliphatic hydrocarbon chain which may be interrupted by —O— or —NH— and which chain contains at most 6 carbon atoms, B represents hydrogen, $C_{1-2}$ alkyl, methoxy, or phenyl, X represents an anion, $n$ represents 1 or 2, $R_1$ and $R_2$ each represents hydrogen, $C_{1-4}$ alkyl, benzyl or cyclohexyl, $R_3$ represents hydrogen, hydroxyethyl, $C_{1-2}$ alkyl, $C_{1-4}$ alkoxy, benzyl, cyclohexyl or amino, and N taken together with $R_1$, $R_2$ and $R_3$ forms pyridine, and wherein N together with $R_1$ and $R_2$ forms piperidine, pyrrolidine or morpholine and D is selected from the group consisting of a group of the formula

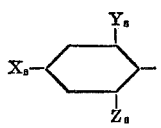

wherein $Y_s$ is hydrogen, chloro, bromo, methyl, nitro, cyano, methylsulfonyl, trifluoromethyl, carbomethoxy, phenoxy or methoxy; $X_s$ is hydrogen, chloro, bromo, methyl, nitro, cyano, methylsulfonyl, carboethoxy, sulfonamido, N-$C_{1-2}$ alkylsulfonamido, N,N-dimethylsulfonamido, phenylazo, chlorophenylazo, dichlorophenylazo, nitrophenylazo, methylphenylazo, carboxy, carbomethoxyethyl, phenoxy, acetyl or ethoxycarbonyl, and $Z_s$ is hydrogen, chloro or bromo; sulfonamidonaphthyl, thiazolyl, nitrothiazolyl, methylsulfonylthiazolyl, cyanothiazolyl, methylthiazolyl, phenylthiazolyl, chlorophenylthiazolyl, thiadiazolyl, phenylthiadiazolyl, methylthiadiazolyl, pyridyl, quinolinyl, indazolyl, triazolyl, pyrazolyl, phenylpyrazolyl, methoxyphenylpyrazolyl, benzthiazolyl, methylbenzthiazolyl, methoxybenzthiazolyl, chlorobenzthiazolyl, cyanobenzthiazolyl, nitrobenzthiazolyl, carboethoxybenzthiazolyl and methylsulfonylbenzthiazolyl.

5. The basic azo-dyestuff according to claim 1 and corresponding to the formula

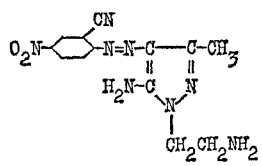

6. The basic azo-dyestuff according to claim 1 and corresponding to the formula

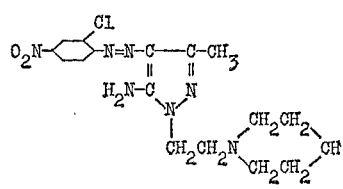

7. The basic azo-dyestuff according to claim 1 and corresponding to the formula

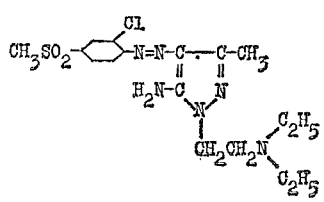

8. The basic azo-dyestuff according to claim 1 and corresponding to the formula

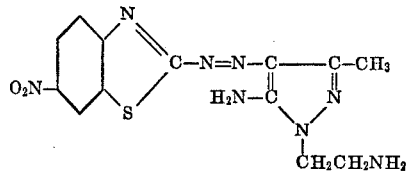

9. The basic azo-dyestuff according to claim 1 and corresponding to the formula

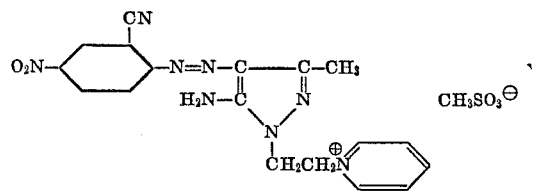

10. The basic azo-dyestuff according to claim 1 and corresponding to the formula

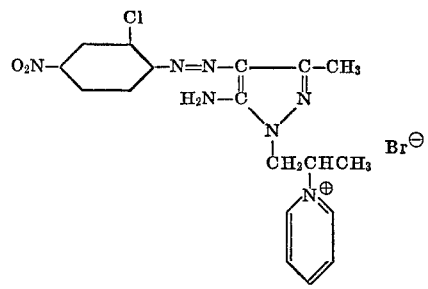

11. The basic azo-dyestuff according to claim 1 and corresponding to the formula

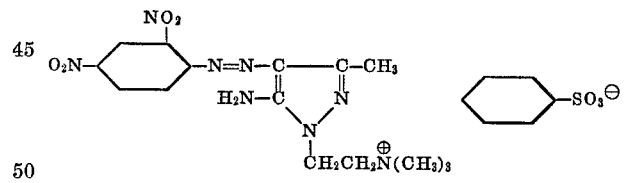

12. The basic azo-dyestuff according to claim 1 and corresponding to the formula

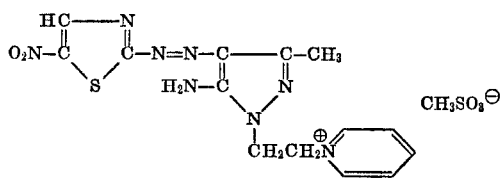

13. The basic azo-dyestuff according to claim 1 and corresponding to the formula

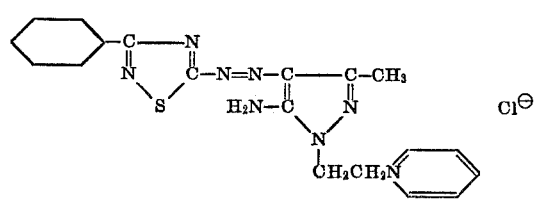

14. The basic azo-dyestuff according to claim 1 and corresponding to the formula
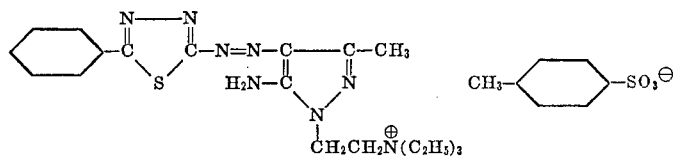
References Cited
UNITED STATES PATENTS
| | | | |
|---|---|---|---|
| 2,435,182 | 1/1948 | Long et al. | 260—162 X |
| 2,998,426 | 8/1961 | Dickinson et al. | 260—163 X |
| 3,117,960 | 1/1964 | Illy | 260—163 X |
| 3,449,317 | 6/1969 | De Montmollin | 260—162 X |
| 3,524,842 | 8/1970 | Grossmann et al. | 260—162 X |
FLOYD DALE HIGEL, Primary Examiner
U.S. Cl. X.R.
106—288 Q; 117—138.8 R, 138.8 B; 260—147, 158, 160, 162, 163

PO-1050
(5/69)

UNITED STATES PATENT OFFICE
CERTIFICATE OF CORRECTION

Patent No. 3,663,528      Dated May 16, 1972

Inventor(s) Visvanathan Ramanathan

It is certified that error appears in the above-identified patent and that said Letters Patent are hereby corrected as shown below:

Column 1, line 7, "Ciba Limited" should be

--- CIBA-GEIGY AG ---.

Column 25, in the lower right-hand portion of the formula of claim 6,

" 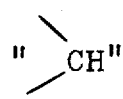 "     should be  ---  ---.

Signed and sealed this 19th day of March 1974.

(SEAL)
Attest:

EDWARD M. FLETCHER, JR.
Attesting Officer

C. MARSHALL DANN
Commissioner of Patents